UNITED STATES PATENT OFFICE 1,945,611

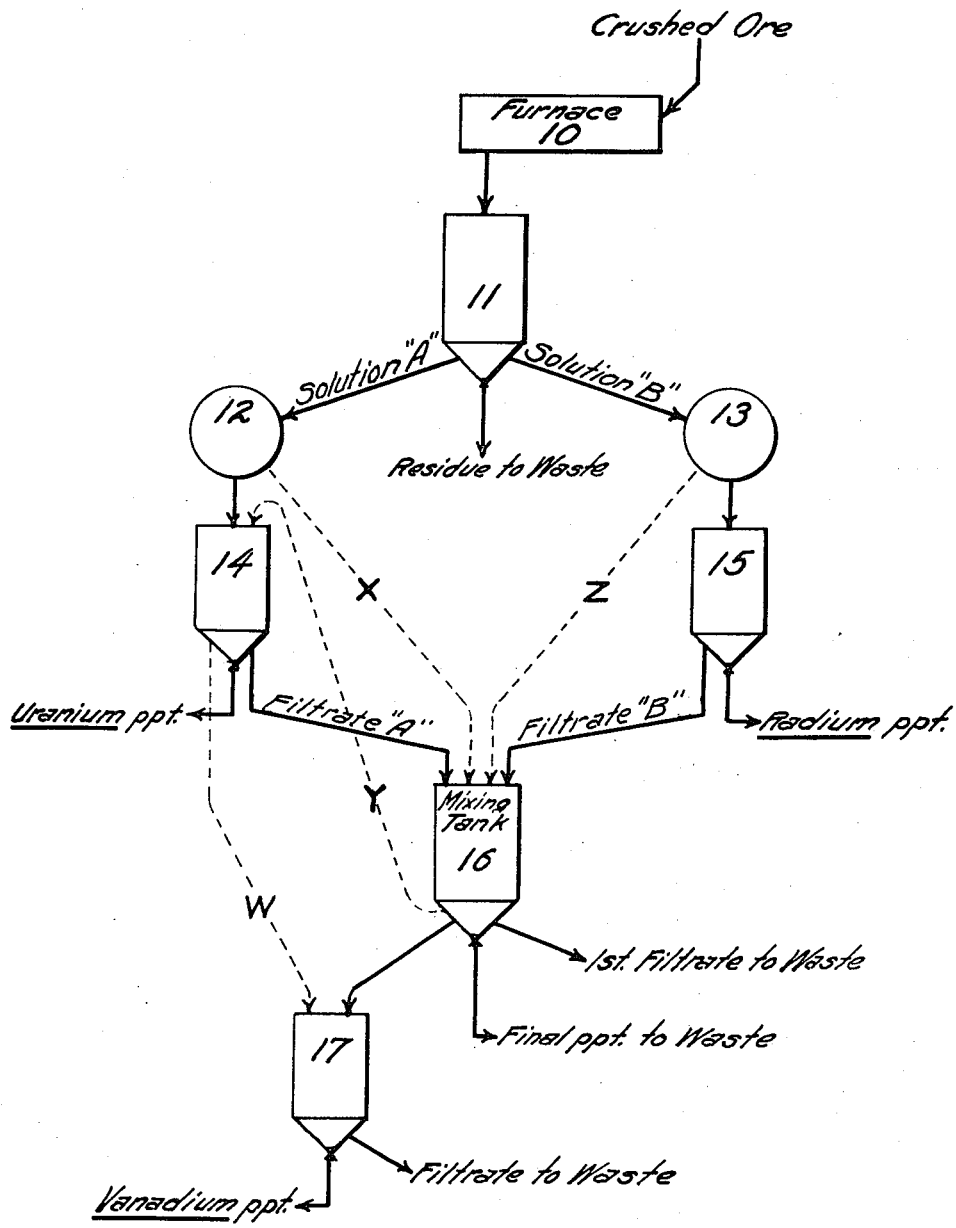

PROCESS FOR TREATING VANADIUM ORES

Charles Knight and Arden M. Wilson, Denver, Colo.

Application November 21, 1930
Serial No. 497,213

10 Claims. (Cl. 23—18)

This invention relates to a process for treating ores which, while more particularly valuable for the recovery of vanadium, uranium, and radium from carnotite and carnotite derivation ores, is also applicable to other ores, such as roscoelite for the vanadium alone.

The principal object of the invention is to provide a means of obtaining a relatively high percentage recovery of the vanadium in the ores treated, together with a simultaneous and satisfactory recovery of the uranium and radium as by-products.

Another object of the invention is to provide a means of obtaining all three metals, vanadium, uranium, and radium, in an immediately marketable form, practically free from objectionable impurities.

A further object of the invention is to provide a process which will materially reduce the cost of treatment over present processes so that it will be practical for ores of comparatively low grade.

A still further object of the invention is to provide a process which will not require the addition of a reagent to the roasting furnace so as to eliminate the resulting volatilization losses and furnace damage due to caking of the material.

A still further object of the invention is to provide a process for the recovery of vanadium which will recover the uranium and radium as by-products of the vanadium process at little, if any, additional cost.

Other objects and advantages reside in the improved process, and in the mediums and reagents employed therein. These will become more apparent from the following description and are to be understood as contemplated in the present invention.

In the following detail description reference is had to the accompanying drawing which forms a part hereof.

The drawing illustrates a typical mill flow sheet or diagram showing the paths of the solutions and the sequence of the steps in the process.

One of the preferred methods of carrying out the process on an ordinary grade of carnotite or carnotite derivation ore is as follows:—

The ore is pulverized, preferably to from 40 to 60 mesh, and is fed to a furnace, indicated at 10 on the drawing, for a preliminary roast. The furnace should preferably be of the continuous type such as illustrated in applicant's Patent No. 1,764,313. The roast should be continued a sufficient time to obtain a complete oxidization of the vanadium. This ordinarily requires from 1½ to 2½ hours at 750° to 850° C. The time of course, depending somewhat on the character of the particular ore.

A leaching tank 11 should be provided having suitable heating coils, an agitator, a filter and means for discharging the filtrate and the precipitate.

*Alkaline leach:*—The hot ore is discharged directly from the furnace 10 into a hot alkaline carbonate bath in the leaching tank 11. The bath may be a solution of soda ash or sodium bicarbonate, the strength being preferably adjusted to about 3-4 times the equational requirements of the iron, vanadium and uranium in the ore treated. For ordinary grade carnotite ores, from 30 to 40 percent of the weight of ore treated is sufficient.

The solution is agitated and boiled from 2 to 4 hours in the leaching tank 11. It is then filtered, giving an alkaline solution which will be herein designated as solution "A". Solution "A" can be run to an alkaline storage tank 12 until needed in later steps of the process. Solution "A" contains from 40–60% of the vanadium content of the ore and practically all of the uranium. The radium remains in the pulp in tank 11. It has, however, been converted to an easily acid-soluble form.

*Acid leach:*—The pulp remaining in tank 11 is now thoroughly washed with hot water to remove the remaining alkali and subjected to a second leaching with a solution of hydrochloric acid. This acid leaching solution can be conveniently made up so as to contain a quantity of HCL equal to approximately twice the weight of soda ash used in the first leach of the given lot of ore treated. In other words, an amount of acid up to the full amount necessary for neutralization of solution "A" can be used without increasing treatment costs, inasmuch as this amount of acid would have to be employed, in any event, to obtain the necessary neutralization of the alkaline solution for precipitation in the later steps.

This use of a stronger acid solution in this step makes possible a much higher extraction of the vanadium remaining in the pulp after the alkaline leach than has ever been possible by the more dilute acid leaches employed in former processes and eliminates the necessity for the usual "second acid leach."

The pulp, after the addition of the acid leach solution is again agitated and heated at or near the boiling point from 1 to 2 hours and again filtered and washed, giving solution "B". The residue after this leach is discharged to waste and the solution "B" is run to an acid storage tank 13 until needed in the later steps. It contains the remaining vanadium content of the ore and practically all of the radium content. We now have all of the values in two solutions, one alkaline (solution A) and one acid (solution B) which have been proportioned to neutralize each other. Before neutralization, however, solution "A" may be run to a uranium precipitating tank 14 and solution "B" may be run to a radium precipitating tank 15.

*Radium precipitation:*—In tank 15 a calculated amount of barium chloride is added to solution "B" and the barium and radium are precipitated as sulphates by the addition of a slight excess of sulphuric acid to the heated solution. The amount of $BaCl_2$ added should be sufficient to insure a thorough cleaning of the solution so as to obtain a maximum precipitation of the radium and to lower the percentage loss due to the slight solubility of the sulphates in the acid solution.

The solution after thorough mixing is allowed to stand in tank 15 until cool, after which it is decanted or filtered from the radium-barium sulphate precipitate which is removed at this point as a marketable radium salt. The filtrate is then run to a mixing tank 16.

*Uranium precipitation:*—Solution "A" in tank 14 is heated and hydrochloric acid is added until uranium carbonate starts to precipitate. A small amount of caustic soda is then added until the uranium precipitate changes from the carbonate to the sodium uranate form, as shown by the change in the color of the precipitate to a light yellow color. The solution is then heated at or near the boiling point from 1 to 2 hours which causes a practically complete precipitation of the uranium as sodium uranate ($Na_2U_2O_7$) in which form it may be readily marketed. The solution is only partially neutralized in this step.

*Admixing solutions A and B:*—The filtrate from the above uranium precipitation which will be herein designated filtrate "A" is then run from tank 14 into the mixing tank 16, and admixed with filtrate B from tank 15. The amount of filtrate A added should be just sufficient to neutralize the acidity of filtrate B and give the resulting mixture a neutral or slightly alkaline reaction. The resulting mixture is heated and preferably agitated. This neutralization causes the precipitation of the vanadium and iron as vanadate of iron.

The usual ore will carry sufficient iron in filtrate B to give the correct VFe ratio for the precipitation. If it does not, sufficient iron salt can be added to filtrate B to give the proper ratio. The filtrate from this step is run to waste.

The precipitated iron and vanadium is then digested with a fresh sodium carbonate solution, plus an oxidizing agent, and is heated a short time and filtered. Hydrogen peroxide is a very satisfactory oxidizing agent for this step provided it is added to a cold solution. The carbonate solution used can be made up to contain about one-half or less of the sodium carbonate used in the alkaline leach of the roasted ore and sufficient $H_2O_2$ added to oxidize the iron.

This second treatment dissolves out the vanadium, leaving the iron on the filter to be discharged to waste.

*Vanadium precipitation:*—The filtrate from the mixing tank 16 is run to a vanadium precipitating tank 17, where it is concentrated if necessary by boiling. It is then cooled and peroxidized slightly with hydrogen peroxide or an alkali peroxide. About 1–2% by volume of 30% $H_2O_2$ is usually sufficient. It is then made slightly acid with hydrochloric acid and heated at about the boiling point from two to four hours.

This causes a practically complete precipitation of the vanadium as hydrous vanadic oxide, which upon fusing yields nearly pure vanadium pentoxide ($V_2O_5$), with an extraction as high as 90%. In this form the vanadium may be marketed or it may be converted to another salt in any manner desired. The filtrate from this precipitation is run to waste.

This procedure for the precipitation of vanadium in the alkaline solutions, obtained as indicated in this process, has given a quantitative recovery of the vanadium from solutions containing as low as 1% $V_2O_5$ and hence adds considerably to the economy of the process by reducing or entirely eliminating the need of concentration of the solutions prior to precipitation of the vanadium.

*Alternate treatments:*—The above sequence of steps is adaptable to all ordinary carnotite and carnotite derivation ores. If an ore carrying little or no uranium such as roscoelite, is being treated solution A can be by-passed, as shown by dotted flow line X, direct to the mixing tank 16. If no uranium is present the filtrate from tank 16 would then be run direct to the vanadium tank 17. If a slight amount of uranium is present this filtrate can be passed to the uranium tank 14, as indicated by the dotted flow line Y, for the precipitation of the uranium or contained aluminum before flowing to the vanadium tank 17. In the case of ores carrying no radium, solution B can be by-passed, as shown by the dotted flow line Z, so as to avoid the radium tank 15.

The flexibility of the process in the handling of different grades and classes of ores with a minimum of equipment and a minimum reagent cost is indicated by the above résumé of its possibilities on different classes of ores.

Notes

The preliminary roast also serves to destroy all organic, vegetable matter, and earthly matter and all free sulphur, arsenic, etc., which would interfere with the later steps. It also changes the physical character and increases the porosity of the ore to render it more susceptible to later reactions.

It will be noted that no reagents are added during the roast, such as nitre-cake, common salt, etc., as is usual in present processes so that caking, burn-outs, etc. are avoided.

It will also be noted that usual aqua regia leach with the large excess of expensive acids and the resulting use of excess alkalies for neutralization are avoided and the cost is thereby sufficiently reduced to make the process practical for comparatively low grade ores. In the present process the cost per pound of the leaching reagents is less and the neutralization is accomplished at no additional cost by simply combining the two leaching solutions A and B.

In all former processes, with which we are familiar, in which the alkaline and acid leach solutions have been separately treated for precipitation of the values, it has been necessary to add additional neutralizing reagents to each solution, whereas in the present process the main neutralization is obtained without any reagents other than those already used in the leaching operations.

It is desired to call attention to the fact that the final solution from which the vanadium, or in some cases both the vanadium and the uranium, is precipitated can contain only such impurities as are soluble in an alkaline carbonate solution. This makes it possible to obtain clean precipitates of the metals and discharge the impurities with the iron and sludge from mixing tank 16.

The introduction of the hot ore from the furnace directly into the hot alkaline bath 11 also adds to the efficiency of the present process.

The super-heat generated in the solution and the disintegrating effect resulting from this introduction of the hot ore directly into a hot carbonate bath, does, in a more economical and efficient manner, what previous processes have required autoclaves and other high pressure heating devices to accomplish, i. e. it increases the percent of vanadium dissolved, makes possible a nearly quantitative extraction of the uranium and more completely converts the barium and radium salts to an easily acid soluble form without danger of loss by their precipitation as sulphates in the residues during the longer and stronger acid leach employed in the present process. This longer and stronger acid leach removes the necessity for the second or third acid treatments of residues now required to obtain a satisfactory radium recovery.

While preferred forms of the process and the reagents employed therein have been described in some detail herein, together with the theories which it is believed best explain the success thereof, it is to be understood that the invention is not limited to the precise procedure described nor is dependent upon the accuracy of the theories which have been advanced. On the contrary, the invention is not to be regarded as limited except in so far as such limitations are included within the terms of the accompanying claims in which it is the intention to claim all novelty inherent in the invention as broadly as is permissible in view of the prior art.

Having thus described the invention, what is claimed and desired secured by Letters Patent is:—

1. A process for the treatment of vanadium bearing ores comprising: first treating said ores with an alkaline bath; filtering; removing alkaline filtrate; treating the residual pulp with an acid bath; again filtering; removing acid filtrate; removing uranium from the alkaline filtrate; removing radium from the acid filtrate; then admixing the remaining alkaline and acid filtrates in the presence of iron and in such proportions that a neutral solution results to precipitate the vanadium.

2. A process for the treatment of vanadium bearing ores carrying iron comprising: first treating said ores with an alkaline bath; filtering; removing alkaline filtrate; treating the residual pulp with an acid bath; again filtering; removing acid filtrate; removing uranium from the alkaline filtrate; removing radium from the said acid filtrate; then admixing the remaining alkaline and acid filtrates in such proportions that a neutral solution results to precipitate the vanadium and iron; treating the latter precipitate with an alkaline solution to dissolve the vanadium from the iron; filtering; thence again precipitating the vanadium from the latter filtrate.

3. A process for treating vanadium bearing ores for the removal of vanadium, uranium, and radium, comprising: treating said ore with an alkaline leach; removing the alkaline filtrate from said leach; thence treating the residual pulp with an acid leach; removing the acid filtrate from said acid leach; preceipitating the uranium from said alkaline filtrate; precipitating the radium from said acid filtrate; thence combining in the presence of iron the two filtrates from the uranium and radium precipitations to neutralize each other and precipitate the vanadium from both filtrates simultaneously.

4. A process for treating vanadium bearing ores comprising: successively treating said ores with an alkaline and an acid leach so as to successively remove uranium and radium; thence combining the two filtrates from the two leaches in the presence of iron and in neutralizing proportions to precipitate the vanadium.

5. A process for treating vanadium bearing ores for the removal of vanadium and uranium comprising: treating said ore with an alkaline leach; removing the filtrate; treating the residue with an acid leach; removing the acid filtrate; removing uranium from the alkaline filtrate; removing radium from the acid filtrate; combining the remaining acid with the remaining alkaline filtrates in neutralizing proportions in the presence of iron to precipitate vanadium and iron; discarding the filtrate from the latter precipitation; digesting the vanadium from the filter cake with a sodium carbonate solution; filtering said latter solution; thence successively treating the latter filtrate for the precipitation of uranium and vanadium.

6. A process for treating vanadium bearing ores for the recovery of vanadium, uranium, and radium, comprising: roasting said ore; passing the hot ore from the roast directly into an alkaline carbonate bath; filtering said bath to produce an alkaline filtrate; treating the residue with an acid; removing the acid filtrate; removing uranium from the alkaline filtrate; removing radium from the acid filtrate; and later combining the remaining acid filtrate with the remaining alkaline filtrate in neutralizing proportions in the presence of iron to precipitate the vanadium.

7. A process for treating vanadium bearing ores for the recovery of vanadium, uranium, and radium, comprising: roasting said ore; passing the hot ore from the roast directly into an alkaline carbonate bath; filtering said bath to produce an alkaline filtrate; treating the residue from said latter filtration with hydrochloric acid; filtering; removing the acid filtrate; removing radium from the acid filtrate; treating the alkaline filtrate with an acid to produce uranium carbonate; thence with caustic soda to produce a sodium uranate precipitate; filtering; thence admixing the filtrate from the latter filtration with the remaining acid filtrate in the presence of iron and in neutralizing proportions to precipitate the vanadium.

8. A process for treating vanadium bearing ores for the recovery of vanadium, uranium, and radium, comprising: roasting said ore; passing the hot ore from the roast directly into an alkaline carbonate bath; filtering said bath to produce an alkaline filtrate; treating the residue from said latter filtration with hydrochloric acid; filtering; removing the acid filtrate; treating the alkaline filtrate with an acid to produce uranium carbonate; thence with caustic soda to produce a sodium uranate precipitate; filtering; treating the acid filtrate with barium chloride; adding sulphuric acid to precipitate the barium and radium as sulphates; filtering; thence admixing the filtrate from the barium and radium precipitation with the filtrate from the uranium precipitation in the presence of iron and in neutralizing proportions to precipitate the vanadium; removing the filtrate from the vanadium precipitation; digesting the filter cake with sodium carbonate solution to re-dissolve the vanadium; thence adding an oxidizing agent to the latter solution to precipitate hydrous vanadic oxide.

9. In a process for treating vanadium bearing ores for the recovery of vanadium, uranium, and radium, the steps which comprise: first treating said ore with an alkaline leach; then with an acid leach of sufficient strength to later neutralize the filtrate from the alkaline leach; separating the uranium from the alkaline leach; separating the radium from the acid leach; then later combining the remaining filtrates of the two leaches to neutralize each other in the presence of iron to precipitate the vanadium.

10. In a process for treating carnotite ores the steps which comprise: leaching said ore with an alkaline leach; leaching the residue with an acid leach; removing the uranium compounds from the alkaline leach; removing radium compounds from the acid leach; combining the remaining acid and alkaline filtrates from the two leaches in neutralizing proportions in the presence of iron to precipitate the vanadium as vanadate of iron; discharging the filtrate; digesting the vanadium from the iron with sodium carbonate and an oxidizing agent; thence precipitating the vanadium from the latter solution as vanadic oxide by the addition of hydrochloric acid and an oxidizing agent.

ARDEN M. WILSON.
CHARLES KNIGHT.